(12) United States Patent
Humes

(10) Patent No.: US 8,678,937 B2
(45) Date of Patent: Mar. 25, 2014

(54) SHAFT COUPLING

(75) Inventor: Ryan Charles Humes, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 743 days.

(21) Appl. No.: 12/628,768

(22) Filed: Dec. 1, 2009

(65) Prior Publication Data

US 2011/0129291 A1   Jun. 2, 2011

(51) Int. Cl.
*F16C 1/24* (2006.01)

(52) U.S. Cl.
USPC ............................ 464/7; 464/16; 184/6.11

(58) Field of Classification Search
USPC .................. 184/6.11; 60/39.08; 464/7, 16
See application file for complete search history.

(56) References Cited

U.S. PATENT DOCUMENTS

| | | | |
|---|---|---|---|
| 2,726,523 A * | 12/1955 | Zrodowski | 464/16 |
| 2,956,824 A * | 10/1960 | Kuchler et al. | 277/500 |
| 3,085,838 A * | 4/1963 | Patterson | 184/6.9 |
| 3,242,695 A | 3/1966 | Ross, Jr. | |
| 3,380,555 A | 4/1968 | Myers et al. | |
| 3,447,562 A * | 6/1969 | Hoffman | 184/6 |
| 3,577,746 A | 5/1971 | Dolan | |
| 3,589,471 A | 6/1971 | Edge | |
| 3,621,937 A | 11/1971 | Edge | |
| 3,757,535 A * | 9/1973 | Stein | 464/16 |
| 4,004,433 A | 1/1977 | Calistrat | |
| 4,026,386 A | 5/1977 | Therkildsen | |
| 4,265,334 A * | 5/1981 | Benhase, Jr. | 184/6.11 |
| 4,342,489 A * | 8/1982 | Lenz et al. | 184/6.11 |
| 4,461,376 A | 7/1984 | Lech, Jr. et al. | |
| 4,771,864 A | 9/1988 | Lorimor et al. | |
| 5,119,905 A | 6/1992 | Murray | |
| 6,098,753 A | 8/2000 | Lamarre et al. | |
| 7,285,052 B1 | 10/2007 | Rowell et al. | |
| 7,322,579 B2 | 1/2008 | Riley | |
| 7,491,127 B2 | 2/2009 | Bristol et al. | |
| 8,167,727 B2 * | 5/2012 | Anema | 464/16 |

* cited by examiner

*Primary Examiner* — Victor MacArthur
(74) *Attorney, Agent, or Firm* — Krieg DeVault LLP

(57) ABSTRACT

A shaft coupling is disclosed herein. The shaft coupling includes a tubular portion extending along a central axis. The tubular portion has a maximum inner diameter. The shaft coupling also includes a first set of internal splines positioned in the tubular portion. The shaft coupling also includes a dam rising above the maximum inner diameter in the tubular portion. The dam is spaced from the first set of internal splines along the central axis. The shaft coupling also includes at least one aperture for receiving lubricant for the first set of internal splines. The at least one aperture extends through the tubular portion along an aperture axis transverse to the central axis. A cross-sectional area of the at least one aperture decreases along at least part of the aperture axis. In another feature, the shaft coupling can include a passageway extending through the dam.

20 Claims, 4 Drawing Sheets

SHAFT COUPLING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of N00019-04-C-0093 awarded by the Department of Defense.

BACKGROUND OF THE INVENTION

1. Field of the Invention

The invention relates to the interconnection of rotating structures through splines and also to the lubrication of such splines.

2. Description of Related Prior Art

U.S. Pat. No. 5,119,905 discloses an accessory drive spline lubrication system for a turbine engine reduction gear box. The '905 patent sets forth that an accessory drive spline lubrication system for a turbine engine reduction gearbox prevents the continuing loss of engine oil resulting from an ineffective seal between an engine drive shaft and an accessory driven shaft. The spline area is provided with oil by an annular reservoir which is replenished only on startup of the engine. Oil is shot into the annular reservoir within the drive shaft through an orifice in the rotating drive shaft. At operating speeds, the drive shaft rotates sufficiently fast relative to the velocity at which the oil approaches the drive shaft to prevent the oil from entering the drive shaft.

SUMMARY OF THE INVENTION

In summary, the invention is a shaft coupling. The shaft coupling includes a tubular portion extending along a central axis. The tubular portion has a maximum inner diameter. The shaft coupling also includes a first set of internal splines positioned in the tubular portion. The shaft coupling also includes a dam rising above the maximum inner diameter in the tubular portion. The dam is spaced from the first set of internal splines along the central axis. The shaft coupling also includes at least one aperture for receiving lubricant for the first set of internal splines. The at least one aperture extends through the tubular portion along an aperture axis transverse to the central axis. A cross-sectional area of the at least one aperture decreases along at least part of the aperture axis. In another feature, the shaft coupling can include a passageway extending through the dam.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

Figure 1:
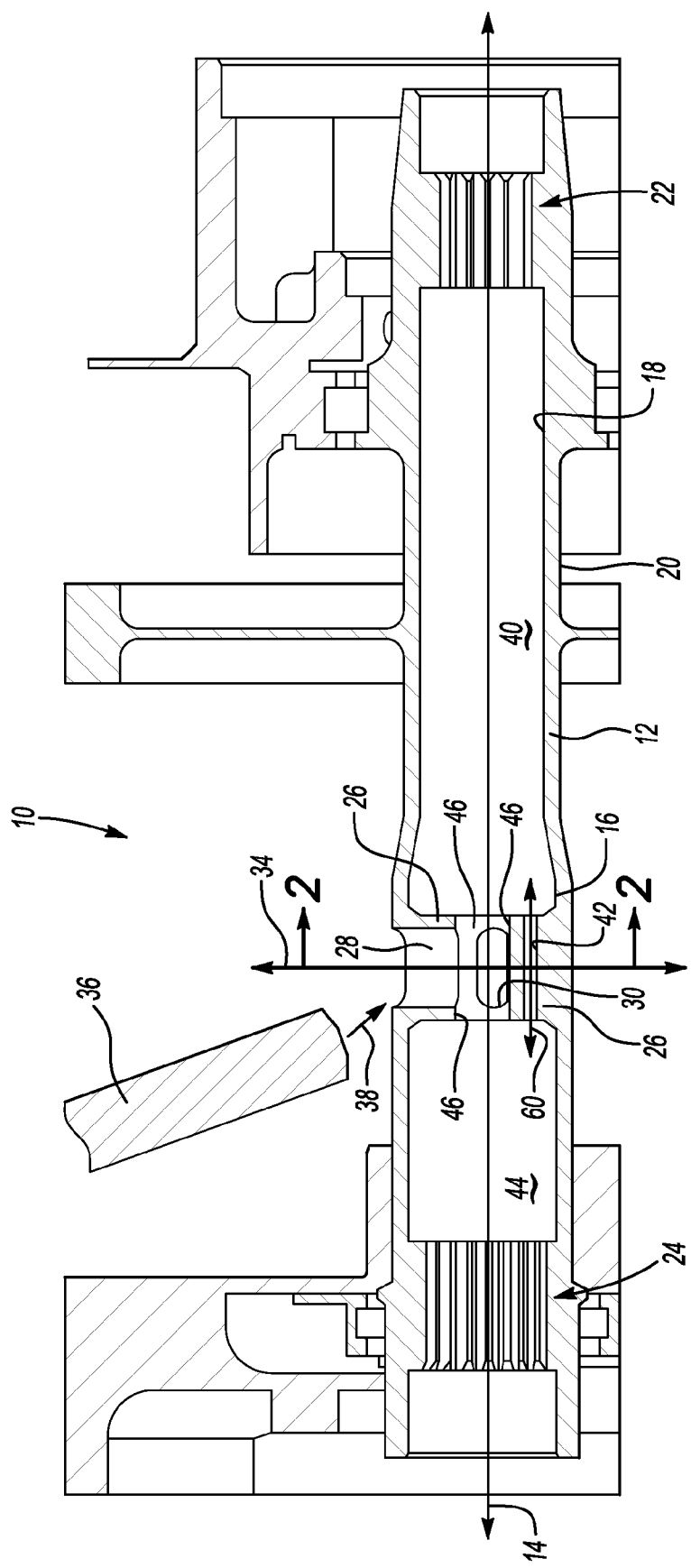
FIG. 1 is a cross-sectional view of a shaft coupling according to a first embodiment of the invention, wherein section lines 1-1 in FIG. 2 show the plane of cross-section.

The invention, as exemplified in the embodiments described below, can be applied to couple two shafts together in a lubricated environment. Lubricant can be directed into the rotating shaft coupling from a static lubricant nozzle that is spaced from the shaft coupling. The features of the exemplary embodiments can be applied individually or in any combination to enhance capture efficiency. Also, the capture efficiency can be improved without compromising the load-transfer capacity of the shaft coupling.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

FIG. 1 show a first exemplary embodiment of the invention. A shaft coupling 10 includes a tubular portion 12 extending along a central axis 14. Embodiments of the invention can be applied to interconnect two shafts or to draw rotational power from a single shaft and transmit the power to another rotatable body such as a gear. The tubular portion 12 has a maximum inner diameter. In the exemplary embodiment, the maximum inner diameter can be defined at position referenced at 16 along an inner surface 18 of the tubular portion 12. The maximum inner diameter can be defined at any position along the central axis 14 in alternative embodiments. The tubular portion 12 can also include an outer surface 20.

The shaft coupling 10 also includes a first set of internal splines positioned in the tubular portion 12, referenced at 22. The splines 22 can engage an input rotational member or an output rotational member. The internal cavity defined by the tubular portion 12 can hold a quantity of lubricant to bathe the splines 22 during operation. The first exemplary embodiment can also include a second set of internal splines positioned in the tubular portion 12, referenced at 24. As will be described in greater detail below, the splines 24 can also be lubricated by the quantity of lubricant held by tubular portion 12.

The shaft coupling 10 also includes a dam 26 rising above the maximum inner diameter in the tubular portion 12. The dam 26 is spaced from the first set of internal splines 22 along the central axis 14. The exemplary dam 26 can be positioned between the first and second sets of splines 22, 24 along the central axis 14. The purpose of the dam 26 will be discussed in greater detail below.

Figure 2:
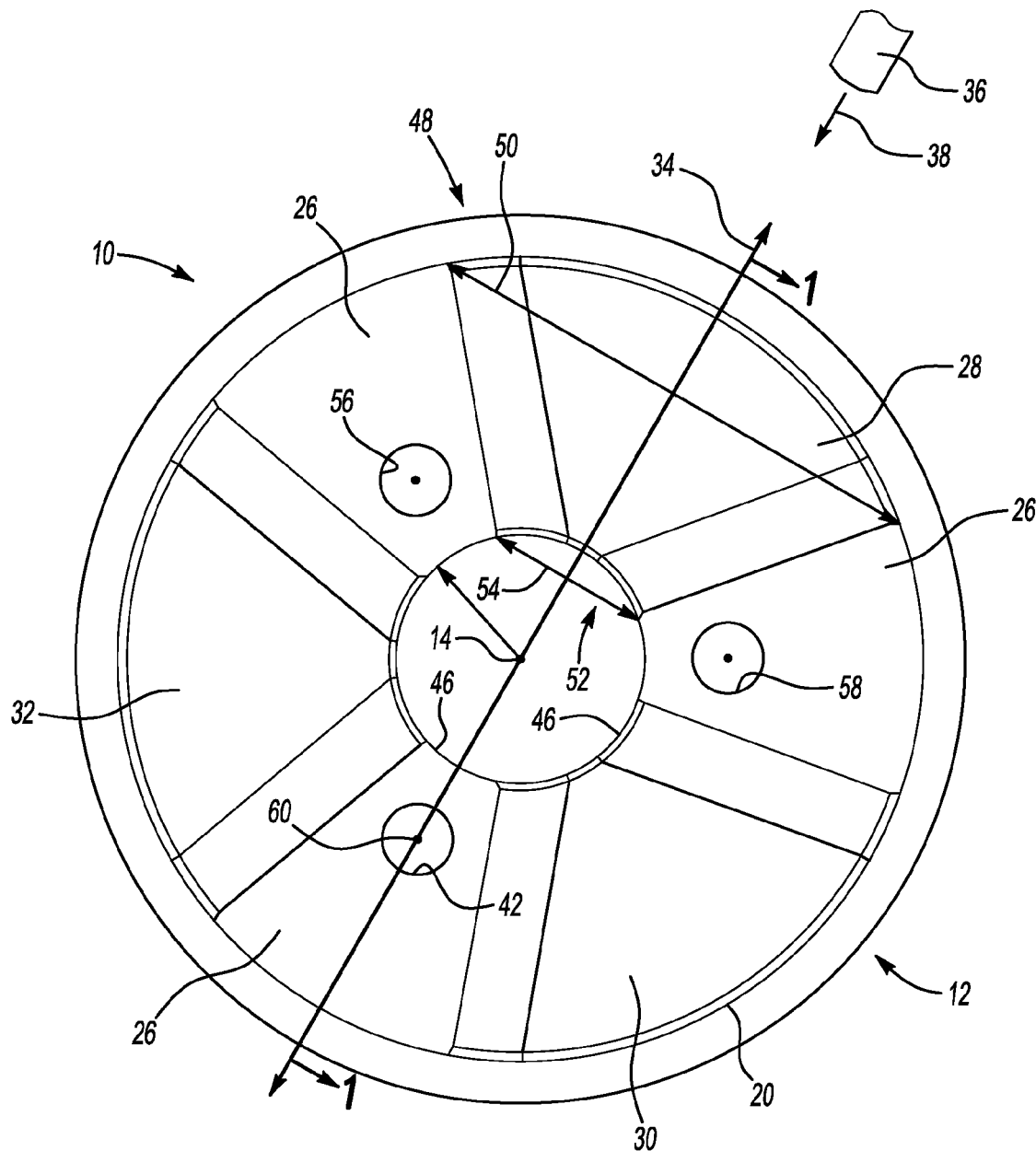
FIG. 2 is a cross-sectional view of the shaft coupling according to the first embodiment of the invention, wherein section lines 2-2 in FIG. 1 show the plane of cross-section.

The shaft coupling 10 also includes at least one aperture 28 for receiving lubricant for the splines 22, 24. As best shown in FIG. 2, the first exemplary embodiment of the shaft coupling 10 can include a plurality of apertures 28, 30, 32 spaced from one another circumferentially about the central axis 14. Referring again to FIG. 1, the aperture 28 extends through the tubular portion 12 along an aperture axis 34 transverse to the central axis 14. The exemplary aperture 28 can be positioned between the first and second sets of splines 22, 24 along the central axis 14. In the first exemplary embodiment, the tubular portion 12 and the dam 26 can be integral and the apertures 28, 30, 32 can extend through both the tubular portion 12 and the dam 26. In alternative embodiments, such as embodiments in which a single set of splines is being lubricated, the aperture 28 can be spaced from the dam 26.

A lubricant nozzle 36 can be positioned to direct lubricant into the apertures 28, 30, and 32. The direction of lubricant stream emitted by the lubricant nozzle 36 is referenced at 38. As the shaft coupling 10 rotates, lubricant can enter the internal cavity defined by the tubular portion 12 when the stream 38 is aligned with one of the apertures 28, 30, or 32. The alignment of the stream 38 with the aperture 28 is shown in FIG. 1. During this alignment, the lubricant stream 38 can be directed into a first half 40 of the internal cavity defined by the tubular portion 12.

Over time, the first half 40 of the internal cavity can accumulate lubricant. The exemplary shaft coupling 10 can also include at least one passageway 42 extending through the dam 26 along the central axis 14. When the quantity of lubricant accumulates and reaches the level of the passageway 42, lubricant can pass through the passageway 42 from the first half 40 of the internal cavity to a second half 44 of the internal cavity defined by the tubular portion 12. The lubricant can then lubricate the splines 24. After further time, lubricant can accumulate to the height or top surface 46 of the dam 26. The lubricant can then pass over the dam 26 and exit the shaft coupling 10 through one of the apertures 28, 30, or 32.

The capture efficiency of the shaft coupling 10 can be enhanced without comprising load-transfer capacity by forming at least one or all of the apertures 28, 30, 32 such that a cross-sectional area of the aperture decreases along at least part of the aperture axis 34. FIG. 2 shows that the aperture axis 34 can be defined along the middle of the aperture 28 such that the aperture 28 can be centered on the aperture axis 34 at every cross-section. A cross-sectional area of aperture 28 can be defined in planes normal to the aperture axis 34. In FIG. 2, planes defining various cross-sectional areas of the aperture 28 would appear as lines.

FIG. 2 shows a plane normal to the central axis 14 and shows the aperture 28 as being wedge-shaped. FIG. 1 shows the aperture 28 from a second perspective in which the aperture 28 does not appear wedge-shaped. However, in alternative embodiments, the aperture 28 could be wedge-shaped in planes corresponding to both views of FIGS. 1 and 2.

The aperture 28 can extend from an entry port 48 having a width referenced at double arrow 50 and positioned at the outer surface 20 of the tubular portion 12. The aperture 28 can extend from the entry port 48 to an exit port 52. The exit port 52 can be positioned between the entry port 48 and the central axis 14 along the aperture axis 34. The exemplary exit port 52 can be positioned at the top surface 46 of the dam. The exit port 52 can have a width referenced at double arrow 54.

The exemplary entry port 48 can be larger than the exemplary exit port 52. As a result, the aperture 28 can define a relatively larger entry port 48 to receive more lubricant from the lubricant nozzle 36. However, the aperture 28 can be formed with a relatively smaller exit port 52 so that more material can be located toward the central axis 14 for enhancing and/or maintaining the load-transfer capacity of the shaft coupling 10. Thus, the capture efficiency of the shaft coupling 10 can be enhanced without comprising load-transfer capacity.

The cross-sectional area of apertures for receiving lubricant can progressively decrease along a majority of a length of the aperture axis 34. The cross-sectional area of the exemplary aperture 28 can progressively decrease along the entire length of the aperture axis 34. Alternative embodiments can be practiced wherein the aperture includes a neck-down portion near the entry port and a portion of constant cross-section near the exit port.

The exemplary aperture axis 34 can intersect central axis 14 but in alternative embodiments the aperture axis can be non-intersecting with the central axis 14. The exemplary aperture axis 34 can be transverse and perpendicular to the central axis 14. In alternative embodiments, the exemplary aperture axis 34 can be transverse and oblique (non-perpendicular) to the central axis 14.

The first exemplary embodiment can include a plurality of passageways 42, 56, 58. Embodiments of the invention can be practiced with any number of passageways. The apertures 28, 30, 32 and passageways 42, 56, 58 can be positioned in alternating arrangement circumferentially about the central axis 14. Embodiments of the invention can be practiced with other arrangements, such as with multiple passageways between each aperture or with multiple apertures between each passageway. The passageway 42 can be circumferentially spaced from the aperture 28 as desired. For example, the exemplary passageway way 42 and the exemplary aperture 32 can be spaced less than ninety degrees from one another circumferentially about the central axis 14, whereas the exemplary passageway way 42 and the exemplary aperture 28 can be spaced greater than ninety degrees from one another circumferentially about the central axis 14.

Referring again to FIG. 1, the exemplary passageway 42 can extend along a passageway axis 60. The passageway axis 60 can be perpendicular to the aperture axis 34. In alternative embodiments of the invention, the axes 60 and 34 can be oblique to one another and/or can be non-intersecting with one another.

Figure 3:
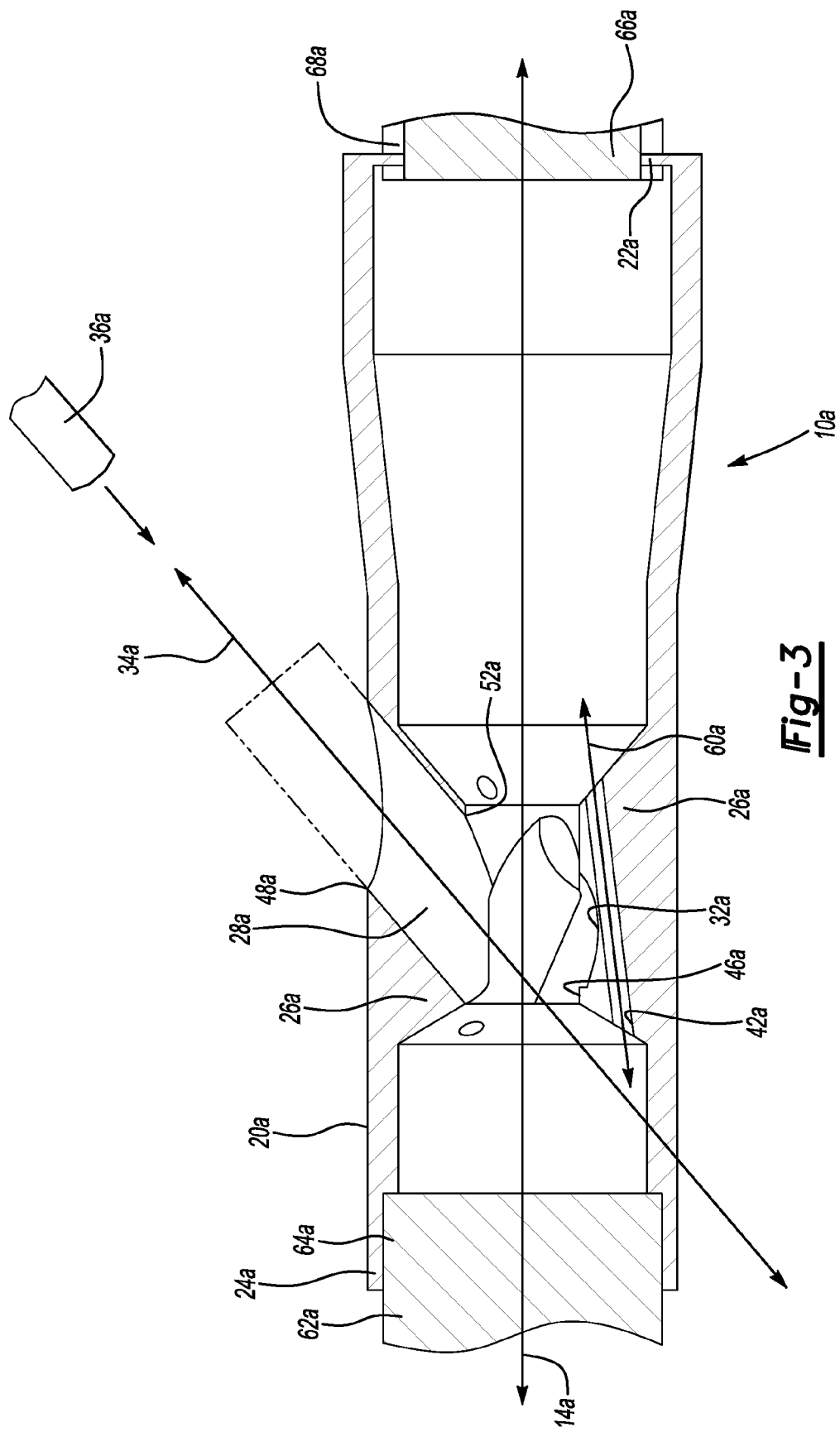
FIG. 3 is a cross-sectional view analogous to the view of FIG. 1 but of a shaft coupling according to a second embodiment of the invention.

FIG. 3 shows a second embodiment of the invention. A first member 62a can include a first set of external splines 64a and be rotatable about a central axis 14a. A second member 66a can include a second set of external splines 68a and be rotatable about the central axis 14a. A shaft coupling 10a can include a tubular member 12a having first and second sets of internal splines 22a, 24a operable to engage the first and second sets of external splines 68a, 64a, respectively.

An aperture 28a can extend along a path between an entry port 48a on an outer surface 20a of the tubular member 12a and an exit port 52a. The path can follow an aperture axis 34a. A cross-sectional area of the aperture 28a can decrease along at least part of the path (such as shown in FIG. 2 regarding the apertures 28, 30, 32). A lubricant nozzle 36a can be positioned to direct lubricant into the aperture 28a.

A dam 26a can be positioned in the tubular member between the first and second sets of internal splines 22a, 24a. The dam 26a can extend to a height to maintain a level of lubricant in the tubular member 12a. A passageway 42a can extend through and be encircled by the dam 26a to communicate lubricant between both sides of the dam 26a.

The exemplary passageway 42a can extend through the dam 26a along the central axis 14a. The exemplary passageway 42a can be centered on straight passageway axis 60a that is oblique to the central axis 14a. The exemplary aperture axis 34a can also be oblique to the central axis 14a, as well as the passageway axis 60a. The second embodiment shows that the apertures and/or the passageways can be arranged in various ways if desired. It can be desirable to form the aperture so that the aperture axis is oblique to the central axis in order to align the aperture with the direction of the lubricant spray and thereby enhance capture efficiency. It can be desirable to form the passageway so that the passageway axis is oblique to the central axis in order to avoid an aperture. As shown in FIG. 3, a radial distance between a top surface 46a of the dam 26a and the at least one passageway 42a varies along the central axis 14a to accommodate an aperture 32a. It can also be desirable to form the passageway so that the passageway axis is oblique to the central axis if the configurations of the ends of the tubular member prevent forming a passageway such as shown in FIG. 1. For example, the configurations of the splines 24a, 22a, may make it necessary to form the passageway 42a to be slanted as shown in FIG. 3.

Figure 4:
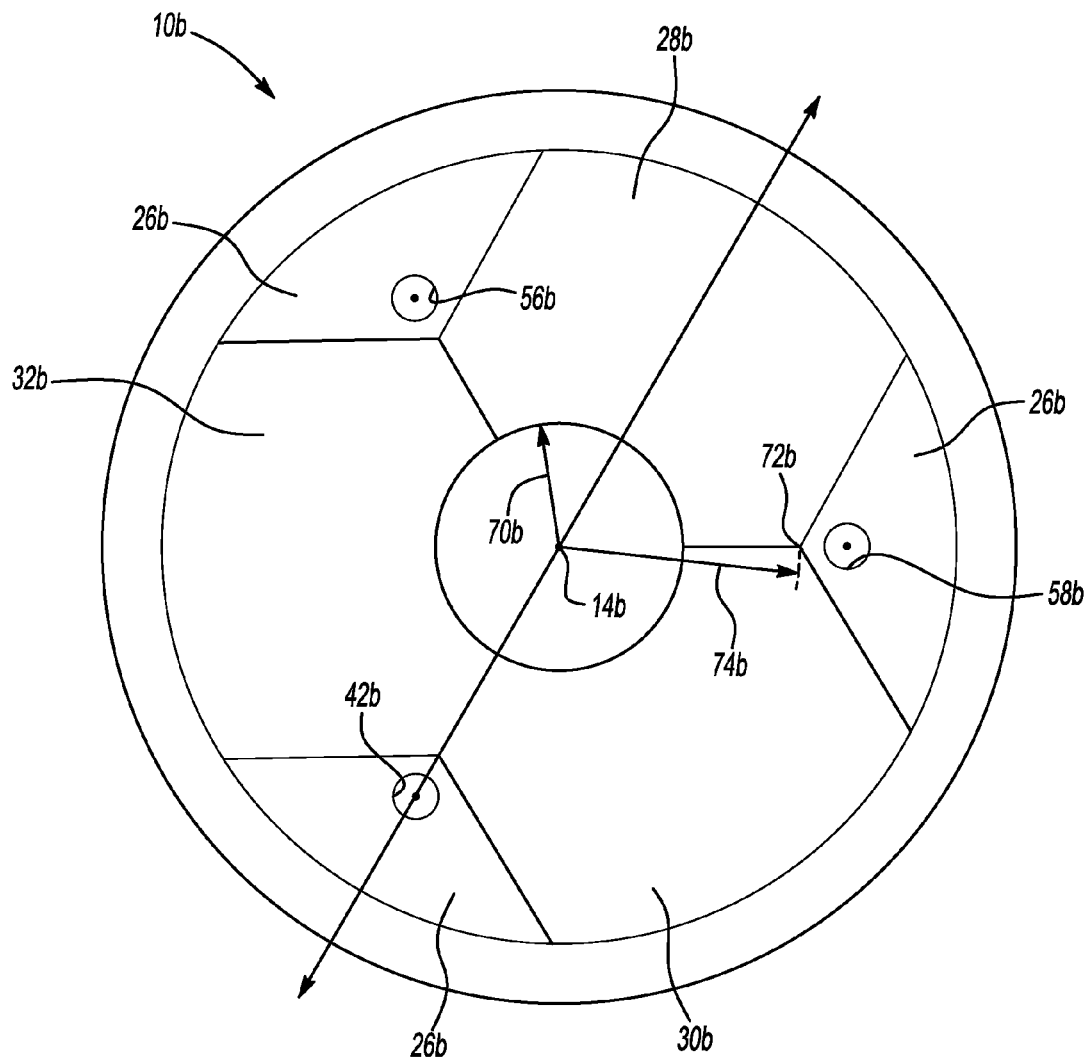
FIG. 4 is a cross-sectional view analogous to the view of FIG. 2 but of a shaft coupling according to a third embodiment of the invention.

FIG. 2 shows that the plurality of apertures 28, 30, 32 can be spaced from one another radially outward of a maximum height (or top surface 46) of the dam 26. For example portions of the dam 26 maintain the apertures 28, 30, 32 as distinct from one another at positions that are located radially further from the central axis than the top surface 46. FIG. 4 shows another embodiment in which apertures of substantially constant cross-section are applied.

A shaft coupling 10b can include a dam 26b and plurality of apertures 28b, 30b, 32b extending through the dam 26b. The plurality of apertures 28b, 30b, 32b can be spaced circumferentially about a central axis 14b. A plurality of passageways 42b, 56b, 58b can extend through the dam 26b. The height of the dam 26b is positioned a radial distance from the central axis 14b a distance represented by arrow 70b. The plurality of apertures 28b, 30b, 32b intersect one another at a radial distance from the central axis 14a greater than the distance represented by arrow 70b. For example, the apertures 28b and 30b intersect at a point referenced at 72b. The point 72b is spaced from the central axis 14b a distance represented by arrow 74b. The distance represented by arrow 74b is greater than the distance represented by arrow 70b.

While the invention has been described with reference to an exemplary embodiment, it will be understood by those skilled in the art that various changes may be made and equivalents may be substituted for elements thereof without departing from the scope of the invention. The passageway through the dam may be applied individually as well as the aperture of decreasing cross-section and the aperture extending along an aperture axis transverse to the central axis. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A shaft coupling comprising:
a tubular portion extending along a central axis and having an outer surface and a hollow interior, said hollow interior defining a maximum inner diameter;
a first set of internal splines positioned in said tubular portion;
a dam extending radially inward from an inner surface of said tubular portion and into said hollow interior, said dam defining a radial top surface positioned inwardly beyond said maximum inner diameter of said tubular portion and said dam spaced from said first set of internal splines along said central axis; and
at least one aperture for receiving lubricant for said first set of internal splines and extending from said outer surface of said tubular portion to said hollow interior, said at least one aperture arranged along an aperture axis transverse to said central axis, wherein a cross-sectional area of said at least one aperture decreases along at least part of said aperture axis, wherein said at least one aperture extends between an entry port positioned at said outer surface of said tubular portion and an exit portion opening into said hollow interior, said entry port being larger than said exit port.

2. The shaft coupling of claim 1 wherein said at least one aperture is further defined as wedge-shaped in at least one plane normal to said central axis.

3. The shaft coupling of claim 1 wherein said cross-sectional area of said at least one aperture progressively decreases along a majority of a length of said aperture axis.

4. The shaft coupling of claim 1 wherein said aperture axis is further defined as perpendicular to said central axis.

5. The shaft coupling of claim 1 wherein said at least one aperture is further defined as extending from said outer surface of said tubular portion to said radial top surface of said dam.

6. The shaft coupling of claim 1 further comprising: a second set of internal splines positioned in said tubular portion such that said dam and said at least one aperture are positioned between said first and second sets of splines along said central axis.

7. The shaft coupling of claim 1 further comprising:
a central passageway extending axially through a central portion of said dam with said at least one aperture in communication with said central passageway; and
at least one additional passageway extending axially through said dam and radially offset from said central passageway, said at least one additional passageway being smaller in size than said central passageway.

8. The shaft coupling of claim 7 further comprising a plurality of said at least one additional passageway extending through said dam.

9. The shaft coupling of claim 7 wherein said at least one additional passageway extending through said dam is positioned between said radial top surface of said dam and said inner surface of said tubular portion.

10. The shaft coupling of claim 1 further comprising a central passageway extending axially through a central portion of said dam with said at least one aperture in communication with said central passageway.

11. The shaft coupling of claim 10 further comprising at least one additional passageway extending axially through said dam and radially offset from said central passageway.

12. The shaft coupling of claim 11 wherein said at least one additional passageway is positioned between said radial top surface of said dam and said inner surface of said tubular portion to pass lubricant through said dam.

13. The shaft coupling of claim 12 wherein said at least one additional passageway is smaller in size than said central passageway.

14. The shaft coupling of claim 11 further comprising a plurality of said at least one additional passageway extending through said dam.

15. The shaft coupling of claim 1 further comprising at least one passageway extending axially through said dam and radially offset from said central axis of said tubular portion.

16. The shaft coupling of claim 15 wherein said at least one passageway is positioned between said radial top surface of said dam and said inner surface of said tubular portion to pass lubricant through said dam.

17. A shaft coupling comprising:
a tubular portion extending along a central axis and having an outer surface and a hollow interior, said hollow interior defining a maximum inner diameter;
first and second sets of internal splines positioned in said tubular portion and spaced from one another along said central axis;
a dam extending radially inward from an inner surface of said tubular portion and into said hollow interior, said dam defining a radial top surface positioned inwardly beyond said maximum inner diameter in said tubular portion and said dam positioned between said first and second sets of internal splines along said central axis;
at least one aperture for receiving lubricant for said first and second sets of internal splines, said at least one aperture extending from said outer surface of said tubular portion to said hollow interior, said at least one aperture arranged along an aperture axis transverse to said central axis; and
a central passageway extending axially through a central portion of said dam with said at least one aperture in communication with said central passageway, and at least one additional passageway extending axially through said dam and radially offset from said central passageway and positioned between said radial top surface of said dam and said inner surface of said tubular portion to pass lubricant through said dam, said at least one additional passageway being smaller in size than said central passageway.

18. The shaft coupling of claim 17 wherein said at least one aperture includes a plurality of apertures extending from said outer surface of said tubular portion to said hollow interior, and said at least one additional passageway includes a plurality of additional passageways extending through said dam, said apertures and additional passageways being positioned in an alternating arrangement circumferentially about said central axis.

19. The shaft coupling of claim 17 wherein said at least one aperture extends between an entry port positioned at said outer surface of said tubular portion and an exit port positioned on said dam, said entry port being larger than said exit port.

20. The shaft coupling of claim 17 wherein a cross-sectional area of said at least one aperture decreases along at least part of said aperture axis.

* * * * *